United States Patent Office 3,560,372
Patented Feb. 2, 1971

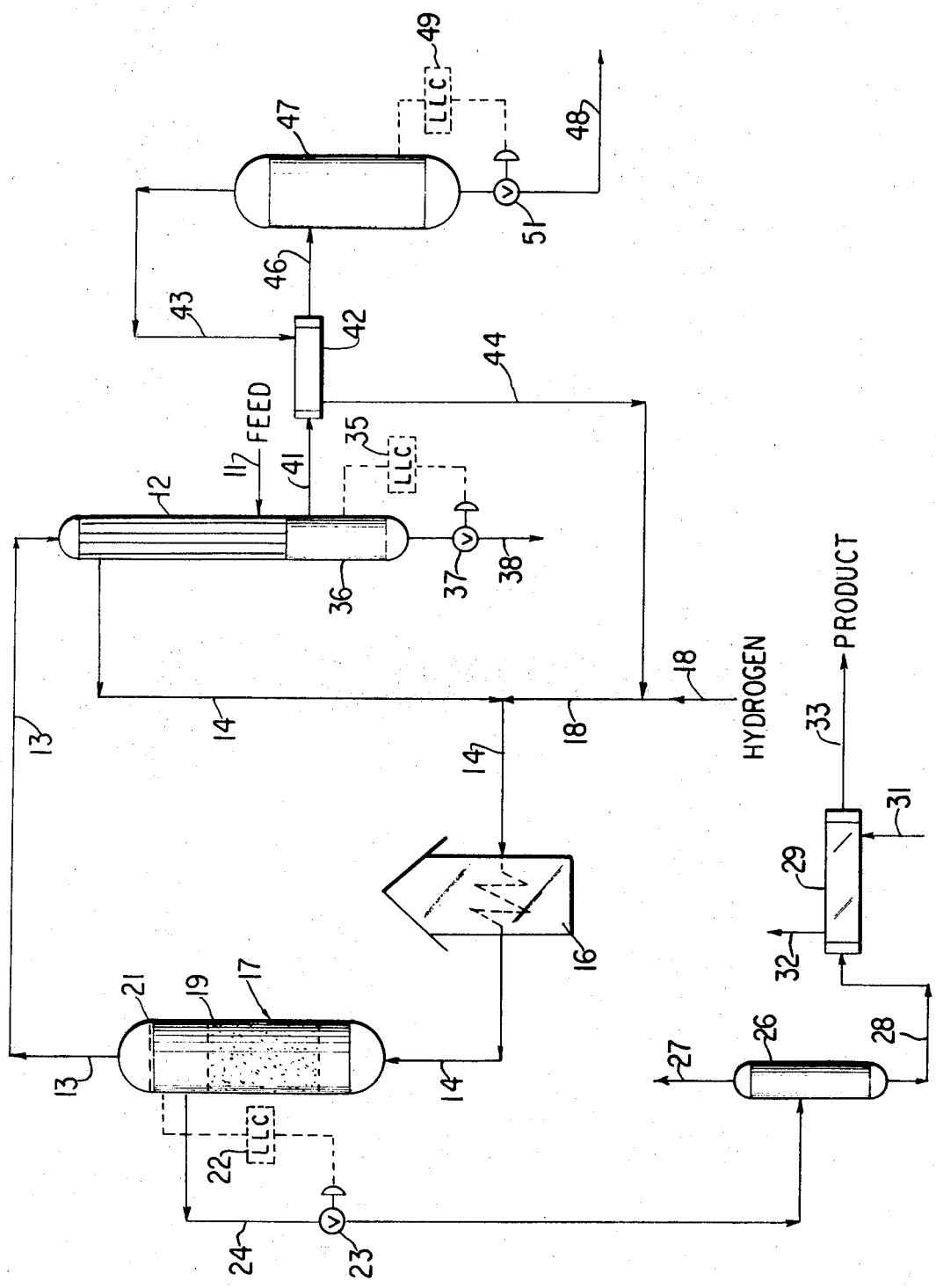

3,560,372
HYDROGENATION OF HEAVY HYDROCARBON OIL
Roger P. Van Driesen, Hopewell, N.J., assignor to Cities Service Research and Development Company, New York, N.Y., a corporation of Delaware
Filed Dec. 26, 1967, Ser. No. 693,342
Int. Cl. C10g 9/16, 7/00
U.S. Cl. 208—48                              2 Claims

ABSTRACT OF THE DISCLOSURE

Operating problems in heat exchangers in which liquid product from the hydrogenation of heavy hydrocarbon oils is cooled are avoided by controlling the ratio of vapor to liquid in the liquid product streams passing through such exchanger so that the vapor to liquid ratio of liquid product within the passageways of such exchangers is maintained at less than about one volume of vapor per volume of liquid. Vapor to liquid ratios in excess of 1:1 and especially ratios in the range of between 1:1 and 5:1 in such situations have been found to cause laminar flow along the walls of the passages of the exchangers, frequently resulting in poor heat exchange efficiency and deposits of solid material, and sometimes leading to complete plugging of exchangers.

---

This invention relates to the hydrogenation of heavy hydrocarbon oils at least a portion of which boil above 975° F. Such hydrogenation reactions may be directed primarily to the cracking of heavy oil to form lower boiling material or may be directed primarily to desulfurization of the oil or a combination of these reactions. Other reactions commonly found in association with these reactions may, of course, also take place. The techniques for conducting hydrogenation of such feedstocks in a wide variety of operating conditions are well-known and established in the art. Among the known techniques for hydrogenation of heavy hydrocarbon oils are those in which the hydrocarbon oil feed together with hydrogen-containingl gas, is passed in an intimate vapor-liquid mixture upwardly through a reaction zone containing a mass of particulate hydrogenation catalyst at a rate sufficient to maintain the solids in random motion and under conditions such that there is a net chemical consumption of hydrogen and that the hydrocarbons in the effluent from the reaction zone are at least partially in the liquid phase. A suitable catalyst system for use in processes of this type is the so-called ebullated bed system described in more detail in U.S. Patent to Johanson, Re. 25,770.

Operation of such hydrogenation processes involves the use of a high pressure hydrogenation reaction zone in which the feed oil is contacted with a mass of hydrogenation catalyst. Liquid and gaseous products may be withdrawn from the reaction zone separately or may be withdrawn together and subsequently separated. In any event, the liquid product of the hydrogenation is usually passed through at least one heat exchanger to cool it for further treatment, storage, etc. Due apparently to the residual quantities of high boiling material frequently present in such liquid product, difficulty has in the past been experienced due to inefficient heat exchange and plugging in such heat exchangers.

It has now been found that this difficulty can be substantially eliminated if the ratio of vapor to liquid in the product liquid stream passing through such exchangers is maintained in the range of less than about one volume of vapor per volume of liquid. While the reason for this is not completely understood, it is belived that the presence of greater quantities of vapor in such liquid streams induces a flow of gas through the center of the stream and laminar flow of liquid along the walls of the exchanger passageways.

Normally an increase in mass flow is thought to increase the turbulence within a conduit containing a flowing fluid. However, it has now been found that when product liquid of the type described above and gas are flowing at relatively low velocities, the gas will tend to pass through one side of the tube (conduit), frequently the portion at the highest elevation in the case of a horizontal conduit. If the vapor to liquid ratio is low, for instance below 1 to 1, there is relatively little of this effect. At higher vapor rates the portion of the tube occupied by the liquid can be reduced to such an extent that the flow becomes more streamlined or laminar due to the effective cross sectional area of flow for the liquid being lowered. The area of tube surface relative to liquid volume is increased and the drag on the liquid is increased. A further increase in gas velocity may actually cause the vapor to flow in an annular core through the conduit. In this case the relative surface of tube to volume of liquid flow increases still further. This can result in laminar flow when there is not enough energy in the vapor stream to shear the viscous film from the wall. A sufficient further increase in vapor velocity will provide enough energy or shear to establish turbulent flow. For operation with heavy oil from residual hydrocracking and operating at proper liquid velocity design for exchangers this will require a vapor to liquid ratio above about five to one. This however is undesirably high since the mass ratio of vapor to liquid increases the overall heat duty to an undesirably high level.

Operation with laminar or viscous flow is undesirable because solids or heavy immiscible liquid material will tend to settle from the oil and foul the exchanger surface. This reduces the efficiency of the heat exchange and may plug the exchanger. In turbulent flow this material is scrubbed from the surface and moved along with the flowing liquid. If the ratio of vapor to liquid in the product liquid passing through such exchangers is maintained less than 1:1 the flow is maintained in a turbulent condition, better efficiency is obtained and there is less possibility for high boiling material to deposit on the walls of the exchanger passageways.

The accompanying drawing is a somewhat diagrammatic illustration in which equipment is shown in elevation of a suitable arrangement of apparatus for carrying out a preferred embodiment of the present invention.

The present invention is useful primarily in the hydrogenation of heavy hydrocarbon oils having significant proportions, usually at least ten volume percent, boiling above 975° F. Suitable feed oils of this type include for instance, residual oil, uncracked gas oil, shale oil, bitumen (including that which occurs naturally, such as that found in the Athabasca tar sands) coal tar and other so-called "bottom of the barrel" materials.

Catalyst suitable for use in the hydrogenation processes of the present invention may be any suitable hydrogenation catalyst, either natural or synthetic, the composition, size and quantity of which forms no part of the present invention. Suitable catalyst includes, for example, cobalt, iron, molybdenum, nickel, tungsten and cobalt-molybdate, as well as their sulfides and oxides, used alone or together with other suitable catalysts, such as naturally occurring silicates, etc., on suitable bases, such as alumina or silica-alumina. The catalyst may be in the form of finely divided particles as small as 40 microns or larger particles, such as those used in fixed bed operations or those described for use in the ebullated bed by the above-mentioned Johanson patent. The term "hydrogenation catalyst" as employed herein refers to any such catalyst irrespective of additional functions such as cracking hydrocarbons, which the catalyst may also perform. Catalyst may be employed in any suitable form such as fixed bed or the ebullated bed described in the Johanson patent.

Hydrogenation processes of the present invention are carried out under elevated conditions of temperature and pressure. Temperatures normally range between about 700 and about 900° F. and pressures between about 1,000 and 3,000 p.s.i.g. partial pressure hydrogen. Hydrogen rates between about 1,000 and about 10,000 standard cubic feet of hydrogen per barrel (s.c.f./b.) of feed are normal for such operations as are space velocities between about 0.2 and about 3.0 volumes of feed per hour per volume of reactor capacity (v./hr./v.).

While the liquid product is sometimes cooled at or near reaction pressure, the pressure on such product is frequently reduced by at least 500 p.s.i. and frequently to at or near atmospheric pressure prior to cooling. Such pressure reductions increase the amount of vapor present in the liquid product stream and frequently make it essential that vapor be removed prior to cooling of the liquid product in order to keep the vapor to liquid ratio of the liquid product within the desired range in the heat exchanger used for cooling the liquid product.

Fluid velocities of liquid product passing through heat exchangers designed for cooling liquid product from such hydrogenation processes are frequently maintained between about 5 and about 10 feet per second but the invention is applicable to any hydrogenation process as described in which such velocities are maintained greater than about two feet per second. In accordance with the present invention, it is essential that ratios of vapor to liquid in liquid product passing through such heat exchangers be maintained at less than about one volume of vapor per volume of liquid to avoid laminar flow, deposits of solids and plugging as described above.

The following example illustrates an application of the present invention to a process for the hydrogenation of heavy hydrocarbon oil to produce product of lower boiling range and sulfur content.

EXAMPLE

Referring to the drawing, heavy hydrocarbon feed oil enters the process through a conduit 11 and passes through a heat exchanger 12 in countercurrent heat exchange with hot product vapors introduced into the exchanger 12 through a conduit 13 as described below. The heavy hydrocarbon feed oil introduced through the conduit 11 is West Texas vacuum bottoms at least 95 vol. percent of which boils above 975° F. and which has a gravity of 10.3° API and contains 3.1 wt. percent sulfur. From the heat exchanger 12 the feed oil passes through a conduit 14 and a preheat furnace 16 into a reactor 17, the interior of which forms a hydrogenation zone. Hydrogen-containing gas obtained as described below is introduced into the conduit 14 as through a conduit 18 and is heated and introduced into the reactor 17 along with the liquid feed.

In the reactor 17, a bed of particulate hydrogenation catalyst is maintained in an ebullated condition as taught by the above-mentioned Johanson patent by the upward flow of liquid and gas through the catalyst bed. In this particular example the catalyst is an extrudate of cobalt-molybdenum on alumina and has an average diameter of 1/32 inch. The hydrogenation zone is maintained at a hydrogen partial pressure of 2,400 p.s.i.g., a total pressure of 3,400 p.s.i.g., a liquid space velocity of 1.0 v./hr./v., and a temperature of 825° F. An upper level of ebullation is maintained at an elevation in the reactor indicated at 19 and an upper liquid level is maintained at an elevation indicated at 21. Liquid level in the reactor may be controlled by suitable means, such as a liquid level controller 22, acting in conjunction with valve 23.

From the reactor 17 product liquid is withdrawn through a conduit 24 and passed through the valve 23 to a separation drum 26 from which vapor is withdrawn as through a conduit 27. The liquid stream passing through the conduit 24 into the drum 26 is at a temperature of 825° F., and a pressure of 225 p.s.i.g. and includes 6,780 ft.³/hr. vapor and 670 ft.³/liquid for a vapor to liquid ratio of 10:1. By removing vapor from the drum 26 the vapor to liquid ratio is reduced to less than 1:1 in accordance with the invention. Liquid from the separation drum 26 is withdrawn through a conduit 28 and passed through a heat exchanger 29 where it is cooled by indirect heat exchange with suitable cooling material such as fresh liquid feed introduced into the exchanger through a conduit 31 and removed through a conduit 32. From the heat exchanger 29, the product liquid is withdrawn to storage or further treatment as through a conduit 33.

Vapor product is withdrawn from the reactor 17 through the conduit 13 and passed in indirect heat exchange with feed oil in the heat exchanger 12 as described above. Liquid is separated from vapor in a separation drum 36. Liquid level in separation drum 36 may be maintained as by liquid level controller 35 and valve 37 and liquid from the separating drum may be withdrawn through a conduit 38 and valve 37. Vapor from the separation drum 36 is passed through a conduit 41 to a heat exchanger 42 where it is passed in indirect heat exchange with recycle hydrogen introduced into the exchanger 42 through a conduit 43 and withdrawn therefrom through a conduit 44. From the heat exchanger 42 the recycle hydrogen proceeds through the conduit 44 to join fresh hydrogen introduced into the process through the conduit 18.

From the heat exchanger 42 vaporous product passes through a conduit 46 to a separation drum 47 in which liquid is separated and may be withdrawn through a conduit 48 and valve 51. Recycle gas is withdrawn from the separation drum 47 and recycled to the process through the conduit 43, heat exchanger 42 and conduit 44 as described above. Liquid level in the separation drum 47 is controlled by a liquid level controller 49 and valve 51. If desired, the recycle hydrogen may, of course, be treated in a conventional manner for removal of impurities therefrom.

Hydrogen introduced through the conduit 18 and recycle hydrogen passing through the conduit 44 have the compositions shown in Table I below:

TABLE I.—COMPOSITION OF GAS STREAMS

| Component: | Makeup hydrogen, conduit 18 (vol. percent) | Recycle hydrogen, conduit 44 (vol. percent) |
|---|---|---|
| $H_2$ | 65 | 78 |
| $N_2$ | 2.3 | 4.0 |
| $CH_4$ | 13.6 | 15.0 |
| $C_2H_6$ | 8.5 | 2.0 |
| $C_3$ | 6.4 | 1.0 |
| $C_4$ | 2.2 | |
| $C_5$ | 2.0 | |

While the invention has been described above with respect to a preferred embodiment thereof, it will be understood by those skilled in the art that various changes and modifications may be made without departing from the spirit and scope of the invention and it is intended to cover all such changes and modifications in the appended claims.

I claim:
1. In a process for the hydrogenation of heavy hydrocarbon feed oil at least about 10 volume percent of which boils above 975° F. in which such feed oil is contacted in a hydrogenation reaction zone under hydrogenation conditions, including a pressure between about 1,000 and about 3,000 p.s.i.g. partial pressure of hydrogen, with hydrogenation catalyst and hydrogen containing gas and in which liquid product from such reaction zone is cooled in a tubular heat exchange zone through which it is passed at a linear velocity of a least about 2 feet per second relative to the wall of the heat exchange zone and in which the pressure of the liquid product is reduced by at least 500 p.s.i. prior to passage of such product through the heat exchange zone whereby the ratio of vapor to liquid of the liquid product of reduced pressure exceeds about 1 volume of vapor per volume of liquid, the improvement which comprises removing sufficient vapor from the liquid product of reduced pressure prior to passage of the liquid product through the heat exchange zone to reduce the ratio of vapor to liquid of the liquid product to less than about 1 volume of vapor per volume of liquid.

2. The process of claim 1 in which the linear velocity of the liquid product in the heat exchange zone is between about 5 and about 10 feet per second.

References Cited

UNITED STATES PATENTS

| | | | |
|---|---|---|---|
| 2,953,514 | 9/1960 | Wilkins | 208—95 |
| 3,224,959 | 12/1965 | Schlinger et al. | 208—107 |
| 3,429,942 | 2/1969 | Nelson et al. | 260—672 |
| 1,876,009 | 9/1932 | Krauch et al. | 208—10 |
| 2,706,167 | 4/1955 | Harper et al. | 208—264X |
| 3,188,286 | 6/1965 | Van Driessen | 208—264X |

DELBERT E. GANTZ, Primary Examiner

G. E. SCHMITKONS, Assistant Examiner

U.S. Cl. X.R.

208—10, 58, 108, 144